United States Patent

[11] 3,557,838

| | | |
|---|---|---|
| [72] | Inventor | Arthur P. Savage<br>RFD 02, Woodbine, Md. 21797 |
| [21] | Appl. No. | 800,171 |
| [22] | Filed | Feb. 18, 1969 |
| [45] | Patented | Jan. 26, 1971 |

[54] DUCT STIFFENER
17 Claims, 2 Drawing Figs.

[52] U.S. Cl. .................................................... 138/108
[51] Int. Cl. ..................................................... F16l 55/00
[50] Field of Search .......................................... 138/108,
(A.C.Dig.); 85/41

[56] References Cited
UNITED STATES PATENTS

| 1,523,268 | 1/1925 | McColl ......................... | 138/A.C. Dig. |
| 1,629,189 | 5/1927 | Weaver et al. ................. | 85/41UX |
| 2,289,785 | 7/1942 | Hutchison .................... | 85/41 |

*Primary Examiner*—Louis K. Rimrodt

ABSTRACT: A duct stiffener device for blind insertion into sheet metal ducts which consists of a rod affixed to a sheet metal type screw.

PATENTED JAN 26 1971

3,557,838

Arthur P. Savage
INVENTOR

DUCT STIFFENER

The present invention relates to the construction of ducts, and more specifically to a device for stiffening and affixing duct structures into a substantially rigid position.

It is generally known that ventilation which are fabricated from relatively light gauge materials, have a tendency to flex during use. This flexing, which is generally referred to as "an oil can effect," becomes most noticeable during periods of intermediate use, and is caused by variations in gas pressure pressure; within the duct acting upon relatively large surface of non supported sheet material.

In the ordinary construction of typical heating and cooling; air ducts "oil canning" effect is minimized by the insertion of supporting members into the ducts at the time of construction. Furthermore, proper construction techniques require the use of various bracing and stressing members which serves to render a relatively light structural material more rigid.

However, it is frequently found that subsequent to the fabrication of a typical light gauge sheet metal ventilation system, areas of flexibility appear which are not contemplated during construction. Correction of these flexible "oil canning" areas subsequent to construction is difficult to achieve without major alteration or disassembly of the duct structure.

It is therefore an object of the present invention to provide an improved nonflexing duct structure.

It is another object of the present invention to provide an improved procedure for correcting areas of objectionable flexibility in ducts.

It is still another object to provide a device which may be readily inserted into a fabricated semiflexible duct structure to stiffen and maintain the duct into a nonoil canning rigid position.

It is a further object to provide an inexpensive duct stiffener which may be readily installed at a minimum of time, skill, and expense.

These and still further objects of the present invention will become readily apparent to one skilled in the art from the following description and drawing wherein.

Broadly, my device comprises a rod extending from or affixed to the end of a threaded screw.

More specifically, the present invention contemplates a threaded screw having a driving head affixed to one end and a rod extending from the other end. The rod extension possesses a diameter less than the maximum effective diameter of the screw threads and a length sufficient to extend from one duct surface to an opposite duct surface. Furthermore, the length of the rod is sufficient to forcibly engage and place under stress the duct surfaces being stiffened.

Figure 1:
FIG. 1 represents a side view of the present duct stiffening device.

Referring to FIG. 1, it is seen that the present device consists of a screw member, generally 1, from which extends a rod 2. The junction point of the screw 1 and the rod 2 is indicated at 3. In one method for preparing the present device the screw member 1 may be affixed to the rod 2 by means of welding or other cohesive attachment methods at point 3. It is also contemplated that screw 1 and rod 2 may be fabricated from a single piece of material by appropriate forming techniques well known to those skilled in the art.

Rod 2 preferably terminates in a pointed end indicated as 4. The threaded member, generally 1, possesses threads 5 which are formed by means of conventional techniques. The threads 5 preferably are of the self-tapping variety, and typically comprise threads found on a common sheet metal-type screw. As shown in FIG. 1, the threads 5 have a maximum effective diameter greater than the diameter of the rod so that, as indicated later, the rod may be extended into an aperture sufficiently small to permit contact with threads 5. Screw member, generally 1, terminates at the end opposite the rod in a driving head 6. As shown in FIG. 1 driving head 6 may comprise a typical slotted screwhead, however, it is also contemplated that driving head 6 may comprise a Phillips-type screw head or a hexagonal or square driving head commonly found on threaded fastening devices.

The length selected for the screw member 1 will depend upon the overall size or length of the device. The ratio of the length of the rod to the screw thread length is preferably in the range of 8 to 32. For example, when the device is to be inserted into an 8 inch duct screw member 1 or the threaded portions thereof may vary from about one-fourth to 1 inch. Larger ducts may require greater screw members up to 2½ to 3 inches in length. However, for most purposes it is found that threaded portions on the order of to one-half to 1 inch is sufficient. Also, the diameter of the threaded member 1 will vary according to overall scale of application. Typically it is found that screws having standard American threads on the order of number 5 to number 24 (about one-eighth to three-eighths inch diameter), and preferably on the order of from number 8 to number 12 will provide sufficient strength for the applications contemplated herein.

As shown in FIG. 1, the rod member 2 is shown to be broken so as to indicate indeterminate length. The rod member is generally of a length which is equal to the size of the duct opening to be stiffener stiffened. For instance, when an 8-inch duct is to be stiffened, the rod member 2 will be approximately 8 inches. It is generally contemplated that the present device may be inserted into ducts having an opening size of from about 3 to about 24 inches. Accordingly, the rod member 2 will be selected for appropriate stiffness commensurate with length. Generally, the diameter of rod member 2 may vary from one-sixteenth to one-quarter inch in diameter, and preferably from about three thirty-seconds to three-sixteenths inch in diameter. The rod and the screw member are prepared from material such as steel and aluminum which have appropriate temper and strength characteristics required for the present application.

Figure 2:
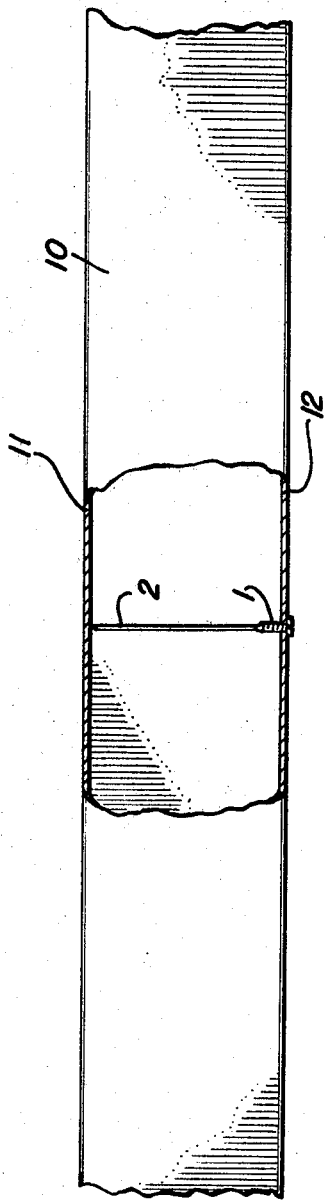
FIG. 2 is a view of the present device installed in a typical duct section having a part thereof cut away.

The ducts into which the present device is inserted is typically portrayed in FIG. 2 wherein duct, generally 10, possesses an upper surface 11 and bottom surface 12 as shown in the cutaway portion of the FIG. The duct is tp typically constructed of sheet steel or sheet aluminum having a thickness corresponding to 30 to 14 gauge. It is also contemplated that the duct material may constituted plastic such as polyester or epoxy reinforced with fiber glass.

In operation, the present device is inserted into a hole punched in the bottom surface 12 of duct 10 as shown in FIG. 2. As shown in FIG. 2, the device, when threaded into the bottom surface 12 of the duct 10, extends from the bottom surface 12 to the upper surface 11. The pointed end of the device contacts the upper surface 11 and is maintained in position by frictional contact therewith. Thus, it is seen that in a typical application the present device is installed by the following steps:

1. A hole is punched in the bottom surface 12 of duct 10 by means of a pointed instrument such as an ice pick or scratch awl, or alternatively the hole may be formed by drilling.

2. The rod 2 is inserted into the hole to the point where threads 5 engage the bottom surface of the duct.

3. The threaded member is screwed into the bottom of the duct whereupon the rod 2 is forced upward against the upper surface 11 of the duct.

Preferably, the length of rod 2 is selected so that the upward movement imparted by the screw member forces the upper surface 11 of the duct slightly away from the lower surface 12 (about one-eight to three-quarter inch). The precise length selected depends upon the nominal dimension of duct 10, i.e. the distance between 11 and 12, and also upon the actual dimension, depending upon the degree of distortion occuring in the duct due to installation procedures. Generally, it is found that when the rod 2 is cut to the length of actual dimension or distance existing between duct surfaces 11 and 12, sufficient tension is developed in the duct by the complete screwing; in a screw member 1. The adjust of rod 2 may be effected by providing rods somewhat overlength and subsequently cutting the rod to length as required by the particular duct installation.

In a particularly preferred embodiment of the present invention, the adjustment of the length of rod 2 is conveniently provided for by installing points of weakness shown as 15 in FIG. 1 in rod 2. Points of weakness 15 may comprise a partial cutting of rod 2 in a manner which does not substantially reduce the compressive strength of the rod, but which will provide a point of weakness at regularly spaced points along the length thereof. Typically points of weakness 15 as shown in FIG. 1 may be located at one-half to 2-inch increments from the pointed end of the rod 4. In using the preferred embodiment shown in FIG. 1 which possesses points of weakness 15, the rod member is inserted into a blind hole in duct 10 to obtain the measurement of distance between upper surface 11 and lower surface 12. The rod then is withdrawn after marking and broken at the point of weakness which corresponds most closely to the distance between the duct surface 11 and the distance from point 3 on rod 2 and the appropriate point of weakness 15.

As will be appreciated from the above description, the present invention provides a simple inexpensive duct stiffener which may be installed by persons having minimal skill, and which may be applied in a wide variety of typical duct installations. The present device may be readily installed in exposed ducts having generally a rectangular cross section which are accessible from either above or below. It is surprisingly found that when the present device is inserted in the approximate center of a typical duct section, the relatively slender and flexible rod 12 will impart sufficient stiffness to prevent objectionable "oil canning."

While the present device is readily inserted in the existing exposed duct systems, it will be readily appreciated that the device may be inserted into prefabricated duct sections prior to installation. Furthermore, the present device may be readily inserted into existing ducts which are built into a closed space which is generally inaccessible without removal of fixtures and walls. For example, when the offending "oil canning" duct is located within a wall space, the present device is readily inserted by merely drilling a small hole in the wall surface at a point substantially at the center of the offending duct section, and subsequently punching or drilling a hole into the duct section to receive the present device. Upon insertion of the present device as described above, the access hole drilled to the wall is red readily patched and covered. As will be readily appreciated, the correction of flexing or "oil canning" ducts within existing walls heretofore has involved major disassembly and remodeling of the wall structure to permit the insertion of conventional duct stiffening braces or brackets.

The above description of the present device clearly illustrates that the invention comprises a simple, useful apparatus for the stiffening of duct structures.

I claim:

1. A duct stiffening device which comprises:

a. a sheet metal screw having one end terminating into a driving head attached thereto; and
b. a rod extending from the other end of said screw along the central axis thereof, said rod having a diameter smaller than the maximum diameter of the threads of said screw.

2. The device of claim 1 wherein said rod diameter is equal to or less than the root diameter of said screw.

3. The device of claim 1 wherein the ratio of the length of said rod to said screw ranges from 8 to 32.

4. The device of claim 1 wherein said rod is pointed at the terminal end thereof.

5. The device of claim 1 wherein said rod is provided with a plurality of spaced points of weakness along the length thereof.

6. The device of claim 5 wherein said points of weakness are evenly spaced at s distances of from about one-half to 2 inches from each other.

7. In an improved duct constructed from sheet material having opposing substantially parallel surfaces, said duct being stiffened by a bracing member placed between said surfaces to prevent flexing of said surfaces towards and away from each other, the improvement comprising a bracing member which comprises:

a. a threaded screw passing through and engaging one of said duct surfaces, and
b. a rod extending from one end of said screw to forcibly engage the opposite duct surface.

8. The duct of claim 7 wherein the opposite end of said screw terminates into a driving head therefore.

9. The duct of claim 7 wherein said rod extends from said screw along the central axis thereof.

10. The duct of claim 7 wherein said rod possesses a diameter smaller than the maximum diameter of the threads of said screw.

11. The duct of claim 7 wherein said rod has a diameter equal to less than the rod diameter of said screw.

12. The duct of claim 7 wherein the ratio of the height of said rod to said screw ranges from 8 to 32.

13. The duct of claim 7 wherein the end of said rod which engages said duct surface is pointed.

14. The duct of claim 7 wherein said rod is provided with a plurality of spaced points of weakness along the length thereof.

15. The duct of claim 14 wherein said points of weakness are spaced at distances of about one-half to 2 inches from each other.

16. The duct of claim 7 wherein said screw is a sheet metal-type screw.

17. The duct of claim 16 wherein said duct is constructed of light gauge sheet metal.